US007802880B2

(12) United States Patent
Jones et al.

(10) Patent No.: US 7,802,880 B2
(45) Date of Patent: Sep. 28, 2010

(54) SOLID INK STICK WITH CANTED SURFACE

(75) Inventors: Brent Rodney Jones, Sherwood, OR (US); Terry Alan Smith, Aurora, OR (US); Brian Walter Aznoe, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 848 days.

(21) Appl. No.: 11/716,809

(22) Filed: Mar. 12, 2007

(65) Prior Publication Data

US 2008/0225096 A1 Sep. 18, 2008

(51) Int. Cl.
*B41J 2/175* (2006.01)
*G01D 11/00* (2006.01)

(52) U.S. Cl. ........................................ 347/88; 347/99

(58) Field of Classification Search .................. 347/88, 347/99
See application file for complete search history.

(56) References Cited

U.S. PATENT DOCUMENTS 5,223,860 A 6/1993 Loofbourow et al.
5,442,387 A 8/1995 Loofbourow et al.
D478,621 S * 8/2003 Jones .......................... D18/56
6,648,435 B1 * 11/2003 Jones ............................ 347/7
6,672,716 B2 * 1/2004 Jones .......................... 347/88
6,679,591 B2 * 1/2004 Jones .......................... 347/84
6,761,443 B2 7/2004 Jones
6,840,613 B2 1/2005 Jones

FOREIGN PATENT DOCUMENTS

EP 1359014 A1 11/2003
EP 1935650 A2 6/2008

OTHER PUBLICATIONS

EP Search Report, European Patent Office, Mar. 27, 2009.

* cited by examiner

*Primary Examiner*—Matthew Luu
*Assistant Examiner*—Rut Patel
(74) *Attorney, Agent, or Firm*—Maginot, Moore & Beck LLP

(57) ABSTRACT

An ink stick for use in a phase change ink imaging device comprises an ink stick body having a leading surface, a trailing surface, and a top surface. The top surface has a front edge that is rearwardly offset from a top edge of the leading surface, and a back edge that is at least partially rearwardly offset from the top of the trailing surface. A leading canted face extends between the top edge of the leading surface and the front edge of the top surface. A trailing canted face extends between the top edge of the trailing surface and the back edge of the top surface. The back edge includes a key that is complementary to an insertion opening key of an ink loader.

19 Claims, 9 Drawing Sheets

SOLID INK STICK WITH CANTED SURFACE

TECHNICAL FIELD

This disclosure relates generally to phase change ink jet printers, the solid ink sticks used in such ink jet printers, and the load and feed apparatus for feeding the solid ink sticks within such ink jet printers.

BACKGROUND

Solid ink or phase change ink printers conventionally receive ink in a solid form, either as pellets or as ink sticks. The solid ink pellets or ink sticks are typically inserted through an insertion opening of an ink loader for the printer, and the ink sticks are pushed or slid along the feed channel by a feed mechanism and/or gravity toward a heater plate in the heater assembly. The heater plate melts the solid ink impinging on the plate into a liquid that is delivered to a print head for jetting onto a recording medium.

The correct loading and feeding of ink sticks has typically been accomplished by incorporating loading features, such as, for example, keying, guiding, alignment, orientation and/or sensor actuating features, into the exterior surface of an ink stick. The loading features may comprise protrusions and/or indentations that are located in different positions on an ink stick for interacting with key elements, guides, supports, sensors, etc. located in complementary positions in the ink loader. In addition, loading features may include ink stick shapes and/or features that aid a user in visually identifying the ink stick or correctly orienting the ink stick for insertion. For instance, ink sticks may include a surface that has been marked with a visually recognizable symbol such as color slot identifier, logo, or shop keeping unit (SKU) designation.

The loading features of ink sticks have typically been focused on multiple axis interfaces with the ink loader: at least one axis corresponding to insertion and at least one other axis corresponding to feed, with the former axis typically transverse to the latter. For instance, keying and orientation features of an ink stick may be oriented along an insertion axis while support/guidance and sensor features may be oriented along a feed axis.

The manufacturing of ink sticks having multi-axis loading features may be limited by fabrication technology. For instance, previous ink sticks have been manufactured with a formed tub and flow fill process. In this method, the ink stick composition is heated to a liquid state and poured into a tub having an interior shape corresponding to the desired finished ink stick shape. Shapes and features created in this fashion, however, are generally restricted to the bottom and side surfaces of the ink stick. Compression or injection molding may expand the manufacturing capability to allow the formation of ink sticks of nearly unlimited shapes with features on all surfaces. The tooling for such ink sticks, however, may become prohibitively expensive, and the resulting ink sticks may be difficult to remove from the tooling. Benefits to more complex ink shape opportunities exist and can be encouraged as solutions to these manufacturing problems are addressed.

SUMMARY

In one embodiment, an ink stick for use in a phase change ink imaging device comprises an ink stick body having a leading surface, a trailing surface, and a top surface. The top surface has a front edge that is rearwardly offset from a top edge of the leading surface, and a back edge that is at least partially rearwardly offset from the top of the trailing surface.

A leading canted face extends between the top edge of the leading surface and the front edge of the top surface. A trailing canted face extends between the top edge of the trailing surface and the back edge of the top surface. The back edge includes a key that is complementary to an insertion opening key of an ink loader.

In another embodiment, a method of feeding ink sticks in an ink loader of a phase change ink imaging device comprises inserting a first ink stick into a feed channel of an ink loader. A second ink stick is then inserted into the feed channel. A trailing downwardly canted surface of the first ink stick is then abutted with a leading upwardly canted surface of the second ink stick. The abutted ink sticks are then urged toward a melt end of the ink loader.

In yet another embodiment, a set of ink sticks for use in a phase change ink imaging device comprises a first and second ink stick. The first and second ink sticks each have a leading surface, a trailing surface, and a top surface, the top surface having a front edge that is rearwardly offset from a top edge of the leading surface, and a back edge that is at least partially rearwardly offset from the top of the trailing surface. A leading canted face extends between the top edge of the leading surface and the front edge of the top surface. A trailing canted face extends between the top edge of the trailing surface and the back edge of the top surface of the top surface. The back edge includes a key that is complementary to an insertion opening key of an ink loader. The leading canted face of the first stick includes a nomenclature mark identifying a first insertion opening, and the key of the first ink stick is complementary to the insertion opening key of the first insertion opening. The leading canted face of second ink stick includes a nomenclature mark corresponding to a second insertion opening, and the key of the second ink stick is complementary to the insertion opening key of the second insertion opening.

In yet another embodiment, multiple sets of ink sticks of different lengths but otherwise having a similar shape provide differentiation between model or series sets such that a common loader can be used with simple modification to the insertion opening length.

DETAILED DESCRIPTION OF THE PREFERRED EMBODIMENT

Figure 1:
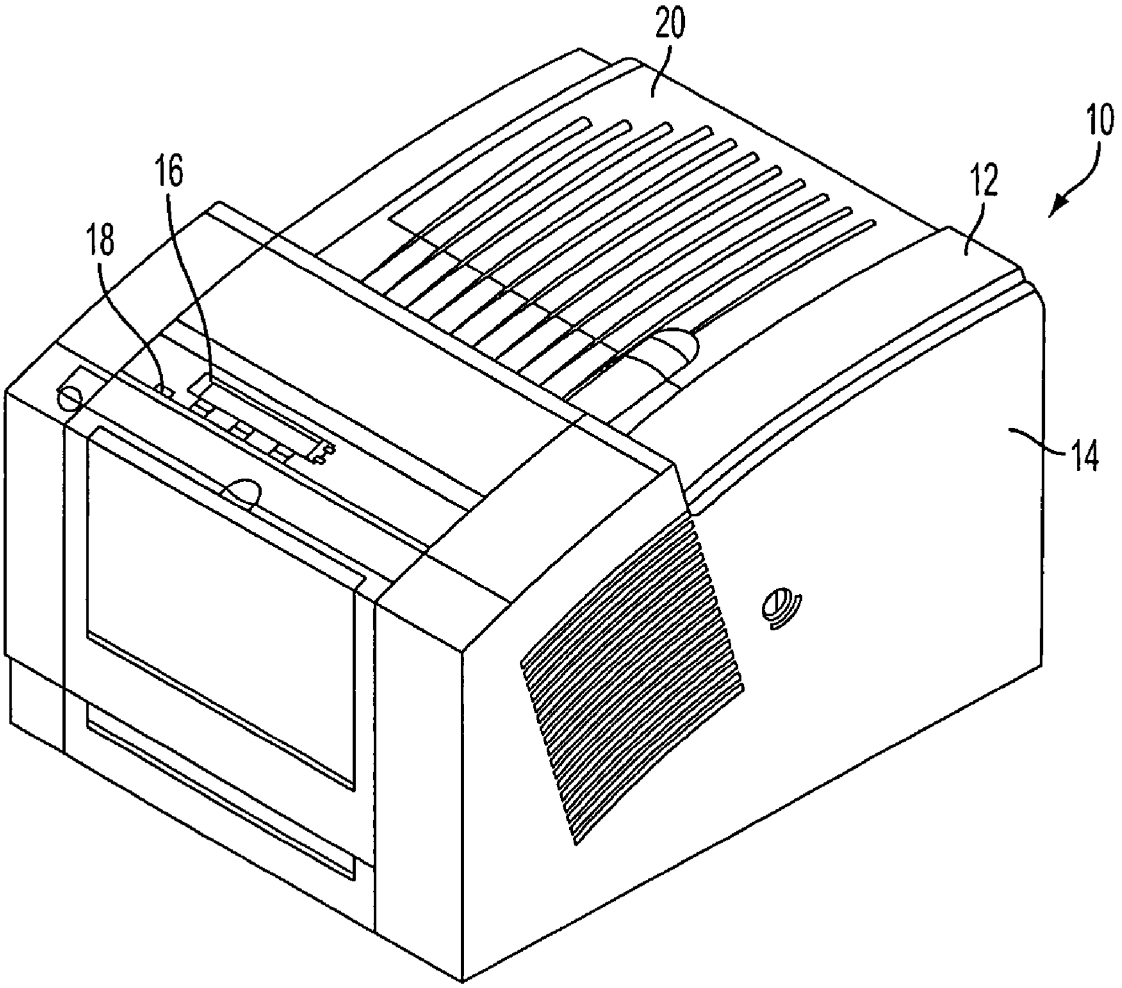
FIG. 1 is a perspective view of a phase change printer with the printer top cover closed.

For a general understanding of the present embodiments, reference is made to the drawings. In the drawings, like reference numerals have been used throughout to designate like elements.

Figure 2:
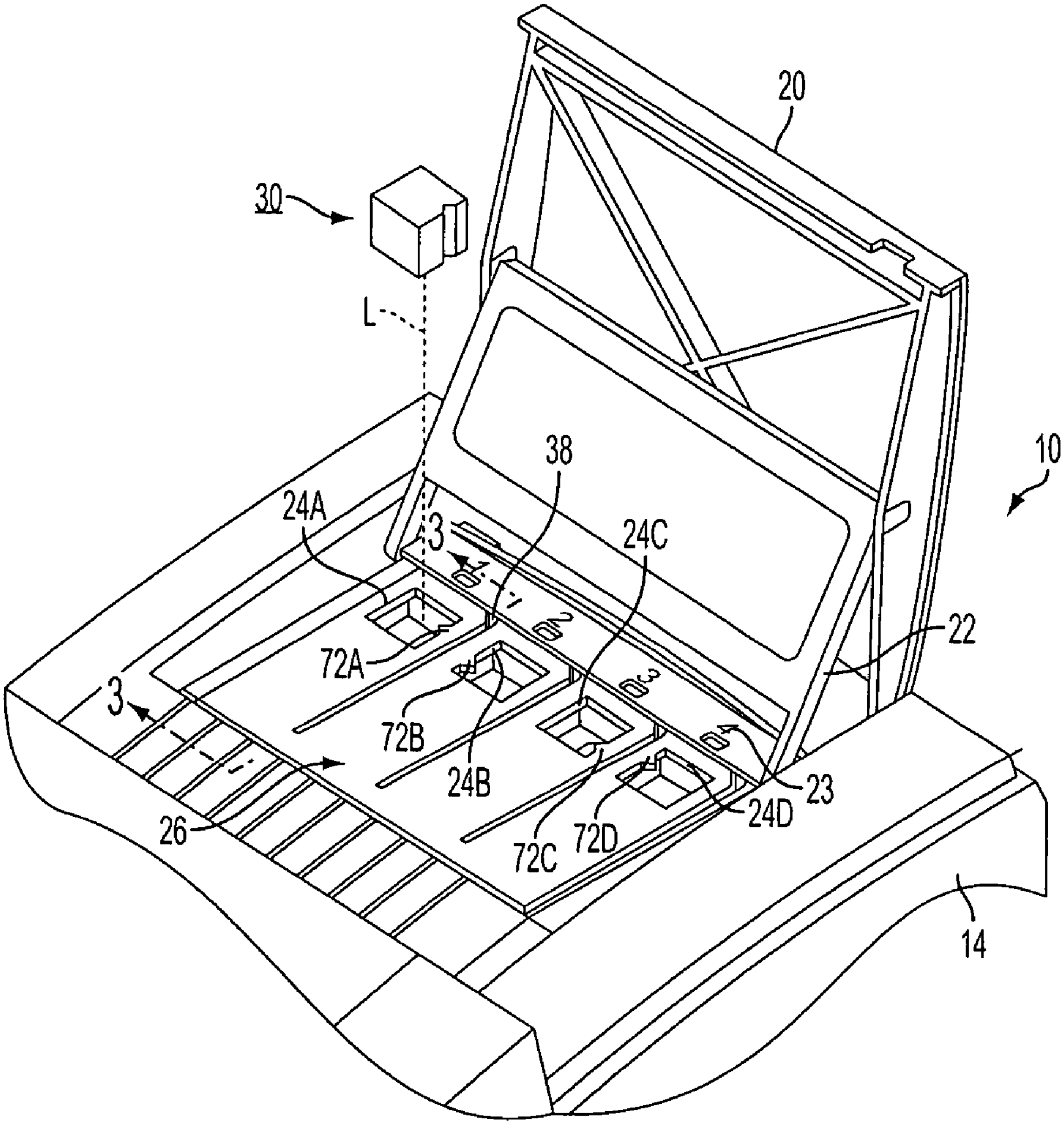
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the operator access to the ink feed system.

Figure 3:
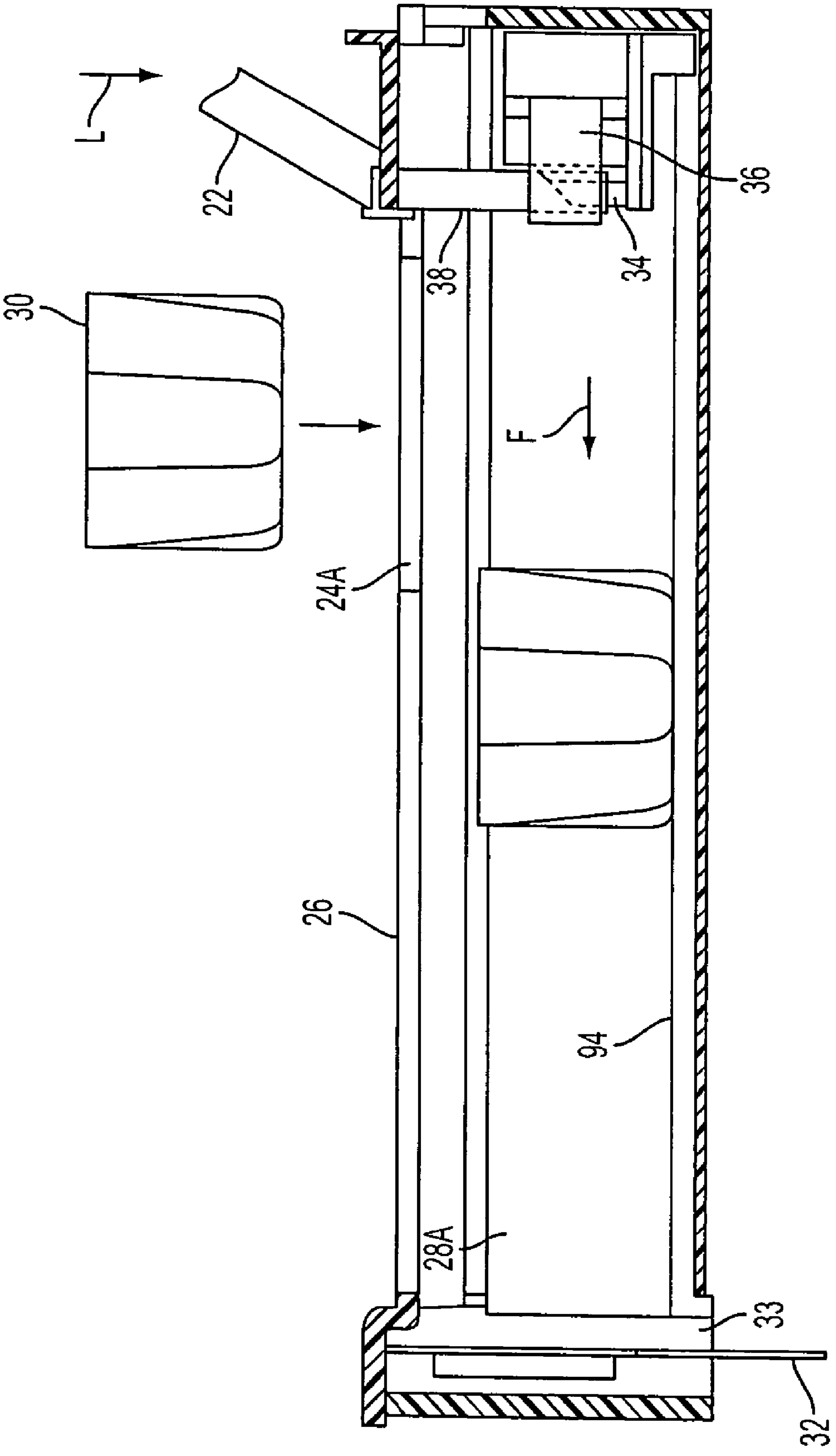
FIG. 3 is a side sectional view of a feed channel of a solid ink feed system taken along line 3-3 of FIG. 2.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

The feed channel 28 receives ink sticks inserted along an insertion axis or in an insertion direction L at the insertion end of the feed channel through keyed opening 24A. A color printer typically uses four colors of ink (yellow, cyan, magenta, and black). Ink sticks 30 of each color may be inserted through a corresponding keyed opening 24A-D and received in a corresponding feed channel 28A-D. The key plate 26 and keyed openings 24A-D are oriented substantially perpendicular to the insertion direction to provide access to the feed channels. The feed channel has sufficient longitudinal length that multiple ink sticks may be inserted into the feed channel. Each feed channel delivers ink sticks along a feed axis or feed direction F of the channel to the corresponding melt plate 32 at the melt end of the feed channel. The melt end of the feed channel is adjacent the melt plate 32. The melt plate 32 melts the solid ink stick into a liquid form. The melted ink typically drips or flows through a gap 33 between the melt end of the feed channel and the melt plate, and into a liquid ink reservoir (not shown). Although the insertion and feed directions are shown substantially straight and perpendicular to each other, the directions need not be straight nor do they need to be perpendicular. For example, the insertion and feed directions, or axes, may be angled or parallel with respect to each other.

Ink sticks may include a number of features that aid in correct loading, guidance and support of the ink stick when used. These features may comprise protrusions and/or indentations that are located in different positions on an ink stick for interacting with key elements, guides, supports, sensors, etc. located in complementary positions in the ink loader. Similarly, ink sticks may include surfaces that are positioned, angled and/or otherwise configured to aid a user in visually identifying the ink stick, orienting the ink stick correctly for insertion and selecting the correct keyed opening for insertion. These surfaces may include marks and/or symbols such as color slot identifier, logo, or shop keeping unit (SKU) designation.

Figure 4:
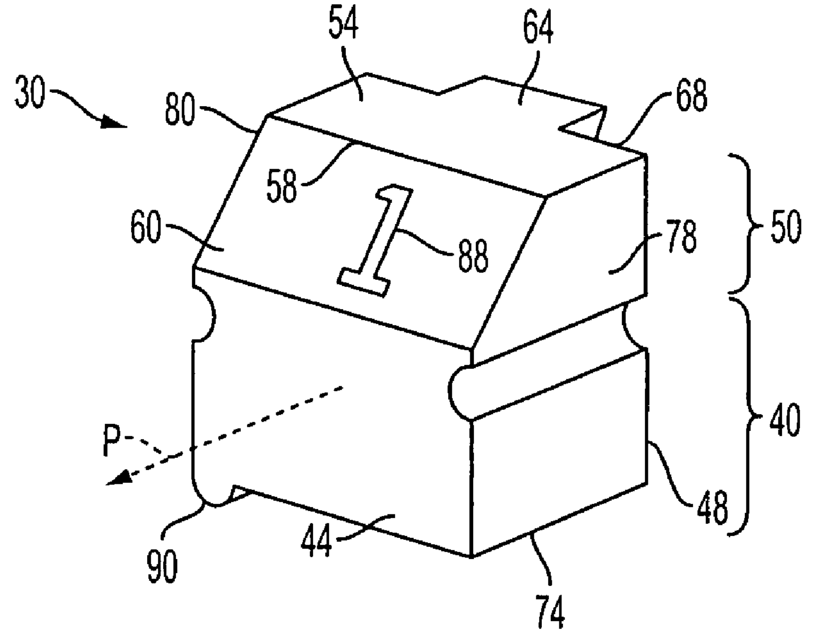
FIG. 4 is a perspective view of one embodiment of a solid ink stick.

Referring now to FIG. 4, there is shown an embodiment of a solid ink stick 30 that includes an orientation/nomenclature surface and loading features along multiple axes. The loading features and nomenclature surface of this embodiment of ink stick are configured to allow the ink stick to be formed with a molding apparatus having two mold halves separable along a single axis to release the molded ink stick (See FIG. 10). As will be described in more detail below, the ink stick 30 of FIG. 4 is configured such that it has no features that are transverse to the parting axis of the mold halves used to form the ink stick. In other words, the ink stick does not include any undercuts that may obstruct or block the ejection of the part from the mold cavity. In this embodiment, the parting axis is substantially along a longitudinal axis P of the ink stick. Therefore, features formed into the top or bottom surface or along the lateral surfaces that are transverse to the longitudinal axis of the ink stick are advantageously avoided.

Referring to FIG. 4, the ink stick 30 is formed of an ink stick body that has a base portion 40 having a leading surface 44 and a trailing surface 48. The ink stick body also includes a canted upper portion 50 extending from the base portion 40. The canted upper portion 50 has a top surface 54 with a front edge 58 that is rearwardly offset from the top of the leading surface 44 of the base portion 40. The front edge 58 of the top surface 54 is connected to the top of the leading surface 44 of the base portion 40 by a canted surface 60. At least a portion 64 of the back edge 68 of the top surface 54 is rearwardly offset from the top of the trailing surface 48 of the base portion. The offset portion 64 of the back edge 68 is connected to the top of the trailing end 48 of the base portion by a trailing canted surface 70 forming a canted extension.

The base portion 40 of the ink stick body also includes a bottom surface 74. The bottom surface 74 of the base portion 40 and the top surface 54 of the canted upper portion 50 may be substantially parallel to one another. The ink stick body also has two lateral side surfaces 78, 80. The lateral side surfaces 78, 80 may be substantially parallel one another and substantially perpendicular to the top and bottom surfaces 54, 74. The top, bottom and lateral surfaces of the ink stick body, however, need not be flat, nor need they be parallel or perpendicular to one another. The ink stick is configured to fit into the feed channel with the two lateral side surfaces 54, 74 of the ink stick body oriented along the longitudinal feed direction F of the feed channel.

In one embodiment, the canted surface 60 of the ink stick 30 may be formed at an angle that is at least 45° relative to the longitudinal axis of the ink stick. This angle allows nomenclature, such as color slot identification, logo, sku, etc., to be formed by a mold tool that separates from front to back along the longitudinal axis of the ink stick. By providing a canted surface 60 at the top/front of the ink stick, a printer operator may be aided in visually identifying the correct orientation of the ink stick for insertion. An additional feature that may reduce the possibility of incorrectly inserting an ink stick of one color into a feed channel intended for a different color is to include a visually recognizable symbol or nomenclature mark 88 on the canted surface 60 of the ink stick. The mark may comprise any symbol that may convey meaning, such as alphanumeric characters, feed direction arrow(s) and the like. The mark may provide a variety of information, such as the printer model for which the ink sticks are intended, or additional color information. Brand names, logos, shop keeping unit numbers (SKU's), etc. may also be formed on the canted surface. It should be noted that the canted face at the front of the stick could have an inset, such as one complementary to the rear projected key feature, such that the face would not be uniformly planer. Face edges may be stepped in this case and all such configurations and variations, though not illustrated, are considered inclusive in this invention. Loader and stick orientation references infer at least a somewhat horizontal feed direction but it should be noted that a more vertical orientation is also contemplated for the present concepts as is insertion into the feed channel parallel to feed.

Figure 6:
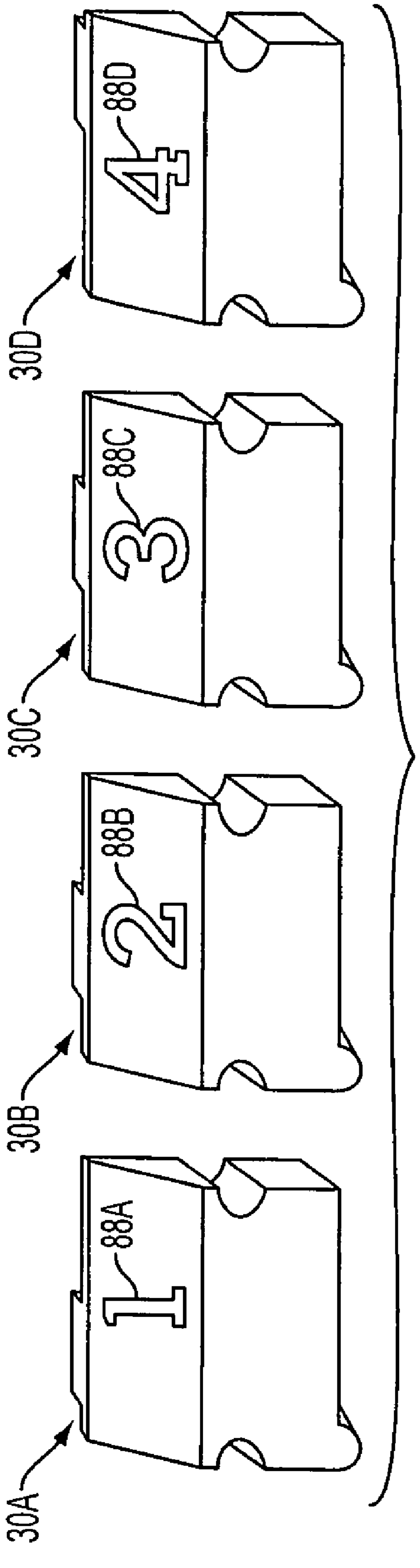
FIG. 6 is a front perspective view of a set of ink sticks showing progressively positioned rear key features.

Referring to FIG. 6, a set of ink sticks for use in a phase change ink imaging device shows the ink stick of the appropriate color identified with an alphanumeric character 88A, 88B, 88C, 88D corresponding to a particular keyed opening 24A-D leading to the appropriate feed channel for that particular color of ink. The nomenclature mark 88 on the ink stick may match a mark placed adjacent a corresponding keyed opening. The ink stick 30A intended for insertion through the first keyed opening 24A of the key plate is marked with, for example, the visually recognizable numeral "1." An ink stick 30B intended for insertion through the second keyed opening 24B of the key plate is marked with the visually recognizable numeral "2." Ink sticks 30C, 30D intended for insertion through the third and fourth keyed openings 24C, 24D of the key plate are marked with the visually recognizable numerals "3" and "4" respectively. Alternatively, the three dimensional visually recognizable symbol 80 could be a letter indicating the color of the ink stick (i.e., "C" for cyan, "M" for magenta, "Y" for yellow, and "K" for black). Color assignments to the channels may be any order appropriate to a particular printer. A printer operator may associate an ink stick having a particular feed channel of the printer, either by correlating the symbol of on the canted surface of the ink stick with the corresponding keyed opening in the key plate, or by correlating the symbol with the corresponding symbol that can be displayed adjacent the keyed opening.

Figure 7:
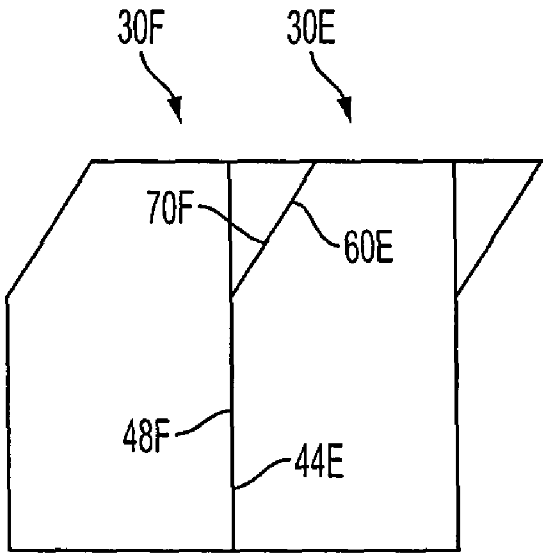
FIG. 7 is a side view of a pair of abutting ink sticks.

In another embodiment, the leading canted surface 60 and the trailing canted extension 70 are angled substantially the same to facilitate the nesting of adjacent ink sticks in an ink loader. As can be seen in FIG. 7, utilization of the similar angles for the leading and trailing canted surfaces of the ink stick enable adjacent ink sticks to abut, or nest, in a feed channel. For instance, referring again to FIG. 7, the leading canted surface 60E of ink stick 30E may abut the canted extension 70F of ink stick 30F, and the leading surface 44E of the base portion of ink stick 30E may abut the trailing surface 48F of the base portion of ink stick 30F. Nesting ink sticks in an ink loader has the benefit of maximizing the load density in the ink loader because empty space between ink sticks is minimized. Additionally, abutting ink sticks in the feed channel ensures that the canted extension of the leading ink stick rests on the canted surface of the following stick and is pressed against the melt plate by the following stick thereby preventing the canted extension from falling to the bottom of a feed channel when the base portion of the ink stick has melted. Nesting ink sticks may also limit the movement of one ink stick with respect to adjacent ink sticks thereby reducing the chance that ink sticks will become skewed with respect to each other or with respect to the feed channel as they travel along the length of the feed channel.

The ink stick may include insertion keying elements for interacting with the keyed openings 24A, 24B, 24C, 24D of the key plate 26 to ensure that only ink sticks intended for a specific feed channel are inserted into the feed channel. Key elements comprise a feature of a particular predetermined size, shape, and location on the outer perimeter of the ink stick body that extend at least partially the length of a side surface generally parallel to the insertion direction L of an ink loader. The ink stick key element may comprise protrusions or indentations that extend at least partially from the top to bottom surface of the ink stick substantially parallel to the insertion axis of the ink loader. Insertion key elements are shaped and positioned to match a complimentary key formed in the perimeter of the keyed opening in the key plate.

Each color for a printer may have a unique arrangement of one or more key elements in the outer perimeter of the ink stick to form a unique cross-sectional shape for that particular color ink stick. The combination of the keyed openings in the key plate and the keyed shapes of the ink sticks insure that only ink sticks of the proper color are inserted into each feed channel. A set of ink sticks is formed of an ink stick of each color, with a unique key arrangement for ink sticks of each color.

Figure 5:
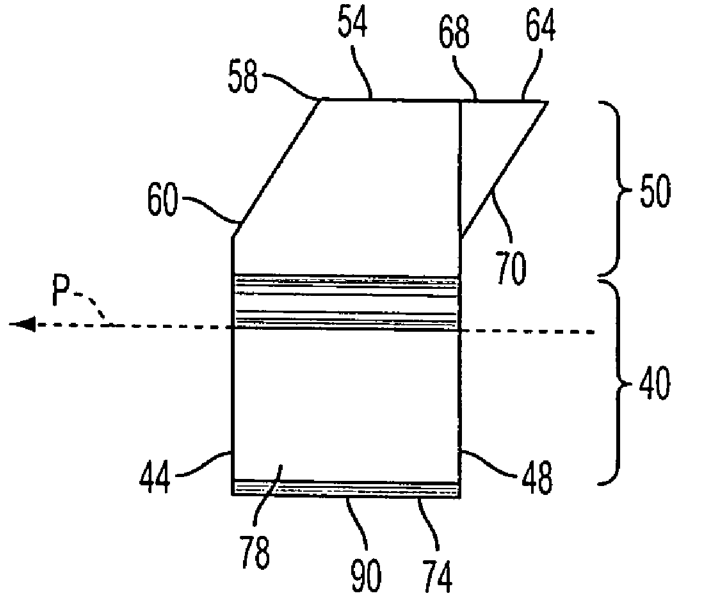
FIG. 5 is a side view of the ink stick of FIG. 4.
Figure 8:
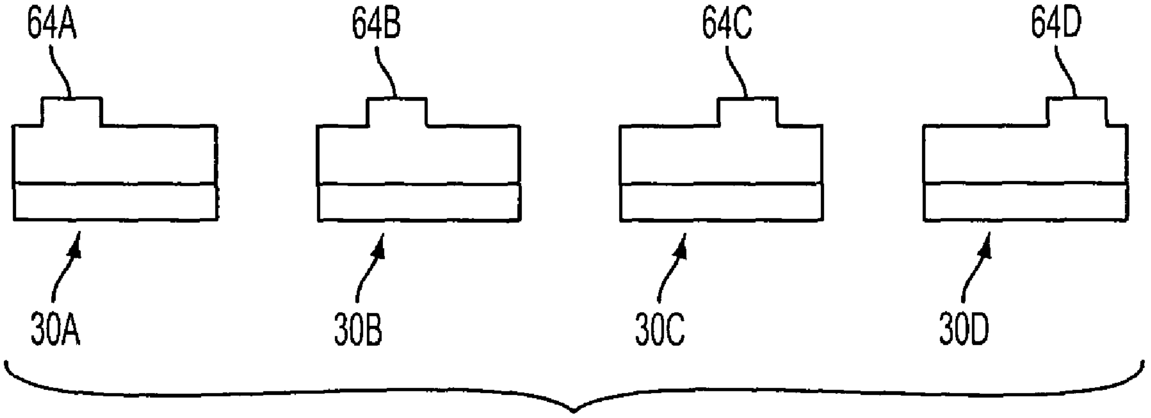
FIG. 8 is a top view of a set of ink sticks showing progressive positioned rear key features.

In one embodiment, the canted extension 64 of the ink stick 30 is configured to serve as an insertion key element. As can be seen in FIGS. 4-6, the canted extension 64 may have a width that is less than the width of the ink stick. Differentiating between colors of an ink stick may be accomplished by positioning the canted extension 64 along different portions of the trailing end of the ink stick. For instance, the positioning of the canted extension along the trailing end of the ink stick may progressively correspond to the progressive position of the keyed opening (and associated feed channel) relative to the other keyed openings in the ink loader mechanism. As an example, FIG. 8 shows a top view of an embodiment of the progressive keying scheme implemented in a set of ink sticks. The ink stick 30A intended for the first feed channel 28A includes an extension 64A that is positioned the farthest to the left with respect to the other extensions 64B-D of the ink sticks 30B-D. The ink stick 30B intended for the second feed channel 28B includes an extension 64B that is positioned the second farthest to the left, etc.

Although the insertion keying system described above involved using a keyed extension extending from the trailing end, other configurations of insertion keying may be used. The insertion keying elements, however, are advantageously formed in the leading and/or trailing ends of the ink stick when sticks are to be nested against one another in a feed stack. Insertion keying elements may be placed at any point or number of points around the periphery of the stick that can be influenced by an insertion opening.

Insertion keying may also be used to differentiate ink sticks intended for different models of printers. One type of insertion key may be placed in all the keyed openings of feed channels of a particular model printer. Ink sticks intended for that model printer contain a corresponding insertion key element. An insertion key of a different size, shape, or position may be placed in the keyed openings of the feed channels of different model printers, similar to stick length differentiation previously described. For example, series keying may be incorporated by changing the length, width and/or placement of the canted extension on ink sticks intended for different models of printers.

In another embodiment, the series keying scheme may include "one way" or compatibility keying features in order to accommodate progressive product differentiation. For example, world markets with various marketing approaches, pricing, color table preferences, etc. have created a situation where multiple ink types or formulations may exist in the market simultaneously. Thus, ink sticks may appear to be substantially the same but, in fact, may be intended for different phase change printing systems due to factors such as, for example, date or location of manufacture; geographic variation including chemical or color composition based on regulations or traditions or special market requirements, such as "sold" ink vs. contractual ink supply, North American pricing vs. low cost markets, European color die loading vs. Asian color die loading, etc.

Compatibility keying may be implemented to ensure that ink stick configurations that are intended to be used with one or more phase change ink platforms, based on marketing approaches, ink formulations, geographic regulations, etc., are used only with those platforms. As an example, an ink formulation for one printer series may be compatible with a second printer series, but ink formulated specifically for the second printer series may not be compatible with the first printer series. Similarly, ink sticks intended for North American markets may be compatible with all printing platforms while ink sticks intended for low cost markets may not be compatible with North American printing platforms. This flexibility in one way keying accommodation allows for the intended multiple product use of some ink while appropriately preventing unintended alternate model use, such as convenience of accepting higher market price ink in a later model while preventing the lower market price ink of the later model from fitting into an earlier model. One way or compatibility keying configurations are defined by same color ink stick shapes that are very similar but differ to the extent that corresponding key plate insertion openings can be somewhat different so that alternate but similar shapes may be admitted or selectively excluded based on the size or configuration difference providing the compatibility keying.

Compatibility keying may be incorporated in a number of ways such as, for example, by varying the number of key features and/or varying a geometric characteristic of the key features or varying one or more dimensions of the ink stick or any combination. By varying the number and/or characteristics of key features, compatibility keying may be extended beyond two platform differentiation. Therefore, many combinations of one way compatibility keying are possible across a wide range of acceptance and exclusion sets.

Figure 11:
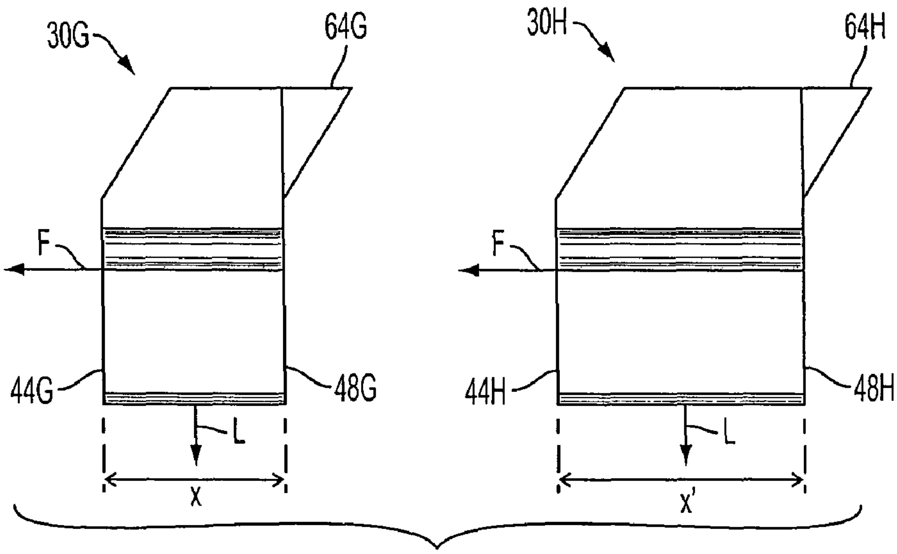
FIG. 11 is a side view of a pair of canted ink sticks showing compatibility keying based on length differentiation.
Figure 12:
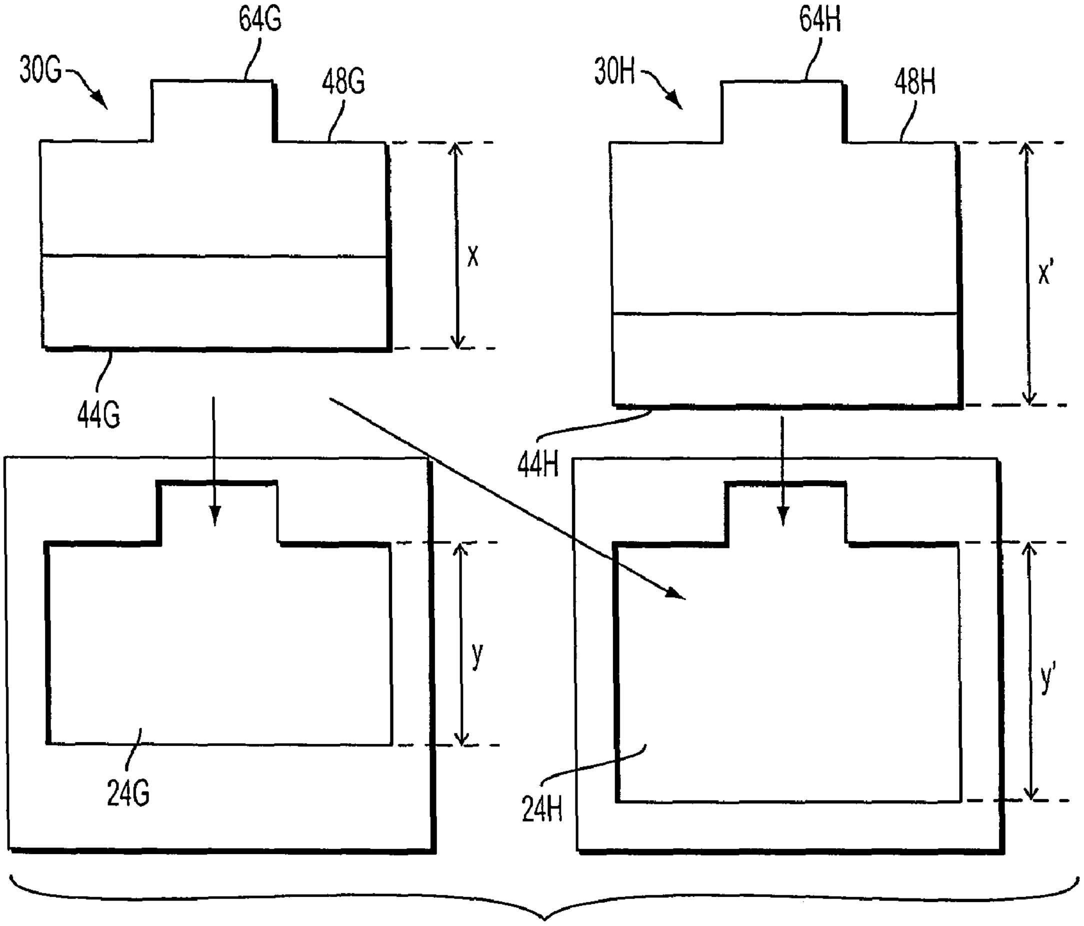
FIG. 12 is a top view of the ink sticks of FIG. 11 and the corresponding keyed openings.

Referring to FIGS. 11 and 12, a compatibility keying scheme based on ink stick length differentiation is shown. FIG. 11 shows a side view of ink sticks 30G and 30H. As can be seen, ink sticks 30G and 30H are similarly configured except they have different lengths extending between the leading end 44G, 44H and trailing ends 48G, 48H, respectively. For example, ink stick 30G has a length X between leading end 44G and trailing end 48G, and ink stick 30H has a length X' between leading end 44H and trailing end 48H that is greater than length X of ink stick 30G. The ink sticks 30G and 30H are otherwise substantially identical including similarly configured and positioned insertion key elements 64G and 64H. The insertion key elements 64 may comprise color keys. Thus, ink sticks 30G and 30H may be of the same color, but may be intended for different ink platforms.

FIG. 12 shows a top view of the ink sticks 30G and 30H and corresponding keyed openings 24G and 24H. The keyed opening 24G has a dimension Y that is sized to allow passage of the corresponding dimension X of ink stick 30G, and keyed opening 24H has a dimension Y' that is sized to allow passage of the corresponding dimension X' of ink stick 30H. To implement compatibility keying based on length differentiation, the dimension Y of keyed opening 24G may be slightly greater than dimension X of ink stick 30G, but smaller than dimension X' of ink stick 30H, and the dimension Y' of keyed opening 24H may be slightly greater than dimension X' of ink stick 30H. Thus, ink stick 30G may be inserted through the keyed openings 24G and 24H. Ink stick 30H may be inserted through keyed opening 24H, but, due to the larger dimension X', ink stick 30H is excluded from insertion through opening 24G.

Thus, essentially identical sticks can be provided in sets with varying lengths where keying features and their position relative to one of the leading or trailing ends are common to the sets, length being the only differentiator. These sets result in one way compatibility where the longer stick would not fit into the shorter opening but the shorter stick would fit into the longer opening. Incremental length changes as described can extend into multiple sets, such as three, four or more, limited only by reasonable length change resolution that provides desired exclusion and by the shortest and longest stick lengths influenced by manufacturability, market pricing objectives and so forth. Incremental length ink sets are optimally provided for by the present easily fabricated canted face stick configuration but can also be an implementation in many other ink designs so this feature is not limited to canted face sticks.

Figure 9:
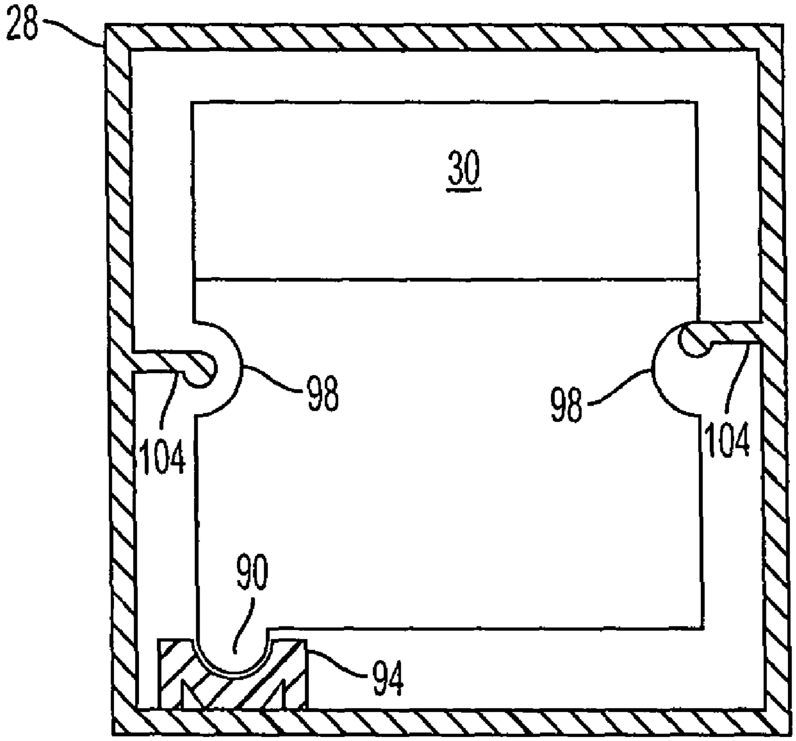
FIG. 9 is a front cross-section view of a feed channel with an ink stick therein.

The ink stick may also include loading features that are along the feed axis. For instance, the ink stick of FIG. 4 may also include one or more guide elements for interacting with guide members in a feed channel to guide the ink stick along the feed channel 28. In one embodiment, the ink stick may include a lower guide element 90 formed in the bottom surface 74 of the ink stick body. The lower guide element 90 is configured to interact with a feed channel guide rail 94 (FIGS. 3 and 9) formed in the bottom of the feed channel 28 for guiding the ink stick 30 along the feed channel 28. In this embodiment, the lower guide element 90 comprises a protrusion from the bottom surface 74. When the ink stick is inserted into a feed channel having an appropriate guide rail 94, the lower guide element 90 of the ink stick 30 slidingly engages the guide rail 94 to guide the ink stick along the feed channel. The protruding lower guide 90 element need not be continuous along the entire length of the ink stick body.

The ink stick may be provided with more than one lower guide element for interacting with more than one guide rail in a feed channel. Moreover, the lower guide element may be recessed into the bottom surface of the ink stick body. A guide rail may be provided in the feed channel that is raised to function with such a recessed lower guide element. The guide rail and the lower guide element may be formed with compatible shapes, and may for example have complementary shapes.

Alternatively or in addition to the lower guide element 90, ink sticks may be provided with guide/support elements 98 formed in the lateral surfaces of the ink stick. For example, referring to FIGS. 4, 5 and 9, the ink stick 30 may include guide elements 98 on the ink stick that are configured to slidingly engage the guide/support rails 104 formed in lateral sides of a feed channel 28. Any suitable number and/or positioning of guide elements may be used. To ensure that the ink stick may be formed with a single-axis mold process, the guide elements may be provided along the bottom or lateral surfaces of the ink stick substantially parallel to the longitudinal axis of the ink stick. Guide elements need not have nominal contact with the ink but may be provided to limit skew and yaw miss alignment as the sticks are fed.

The ink sticks, such as the one described above, that include nomenclature surfaces and loading features may be manufactured using an injection molding or compression molding process. Because the ink stick may be designed without features that are transverse to the longitudinal axis, or parting axis, of the ink stick, i.e. undercuts, the ink stick may be formed using a single-axis molding process. This configuration allows for molding without slides or core pulls thereby decreasing the complexity and cost of manufacturing ink sticks.

Figure 10:
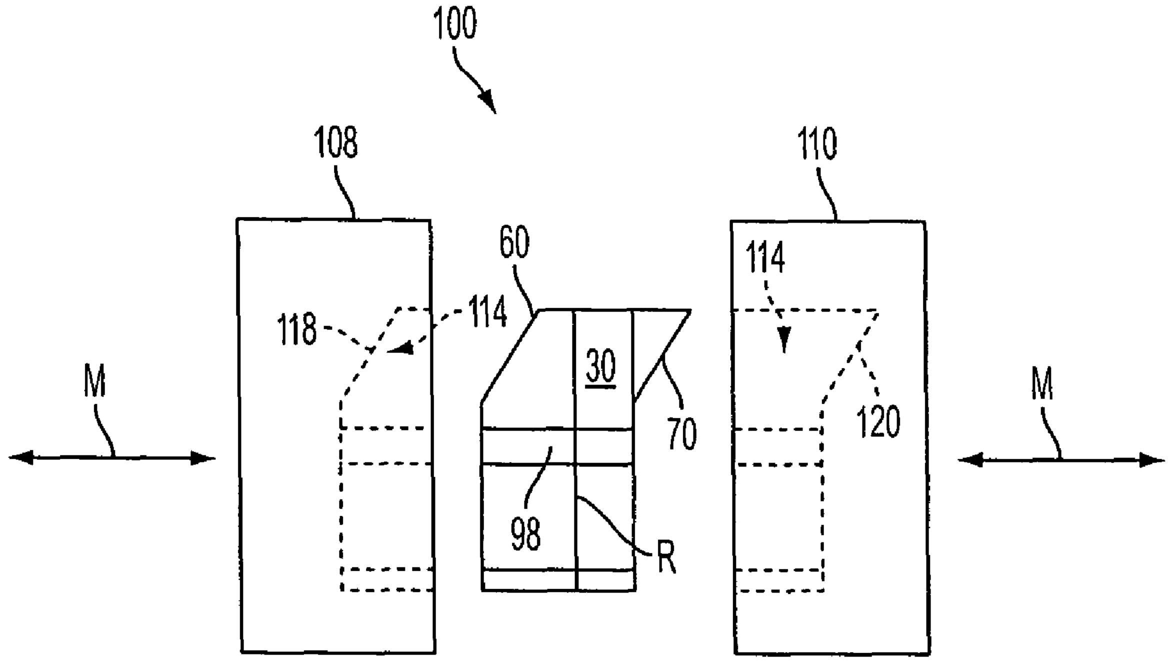
FIG. 10 is a side view of an exemplary molding tool and an ink stick formed therewith.

The ink stick may be formed using a single-axis molding tool 100 such as that shown in FIG. 10 in cross-section. Referring to FIG. 10, an ink stick 30 may be molded from a mold having a single parting surface. As shown in FIG. 10, in producing the ink stick 30, a single-axis, or straight-pull, mold 100 may comprise two halves 108 and 110 that come together along direction M with a cavity 114 between them defining the ink stick shape. The parting surface defines the parting line R which is the position at which the molds meet. The parting line R may be situated along the widest vertical perimeter section of the ink stick 30. In this embodiment, mold half 108 is shaped to conform to the leading portion of the ink stick 30 and includes surface 118 for forming the canted surface 60 of the ink stick. Mold half 110 is shaped to conform to the shape of the trailing portion of the ink stick 30 and includes surface 120 for forming the trailing canted extension 70 of the ink stick. As can be seen, the longitudinally extending guide features 98 are substantially parallel to the parting axis M of the mold. During a molding process, the two halves 108, 110 of the mold are brought together, a measured amount of heated solid ink material is injected into the cavities within the closed mold, the ink material is solidified through cooling or otherwise, the mold halves are separated and the finished ink stick is ejected.

Those skilled in the art will recognize that numerous modifications can be made to the specific implementations described above. Those skilled in the art will recognize that the interface elements may be formed into numerous shapes and configurations other than those illustrated. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An ink stick for use in an ink loader of an imaging device, the ink stick comprising:

an ink stick body having a leading surface, a trailing surface, and a top surface, the top surface having a front edge that is rearwardly offset from a top edge of the leading surface, and a back edge that is at least partially rearwardly offset from the top of the trailing surface;

a leading canted face extending between the top edge of the leading surface and the front edge of the top surface; and a trailing canted face extending between the top edge of the trailing surface and the back edge of the top surface, the back edge including a key that is complementary to an insertion opening key of an ink loader.

2. The ink stick of claim 1, the leading canted face being angled at least 45° relative to a longitudinal axis of the ink stick body.

3. The ink stick of claim 1, further comprising a nomenclature mark formed on the leading canted face.

4. The ink stick of claim 3, the nomenclature mark comprising an insertion opening identifier.

5. The ink stick of claim 3, the nomenclature mark comprising a stock keeping unit identifier.

6. The ink stick of claim 1, the at least partially rearwardly offset portion of the back edge of the ink stick comprising the key.

7. The ink stick of claim 6, wherein a position of the at least partially rearwardly offset portion of the back edge along the back edge of the ink stick corresponds to a position of a feed channel of the ink loader.

8. The ink stick of claim 1, further comprising at least one guide at least partially extending along one or more of a bottom surface and lateral surfaces of the ink stick body substantially parallel to a longitudinal axis of the ink stick.

9. The ink stick of claim 8, the at least one guide being oriented substantially parallel to a feed direction of the phase change ink imaging device.

10. The ink stick of claim 1, wherein the stick is part of a color set and where in there are multiple sets differentiated by the length of the stick.

11. A method of feeding ink sticks in an ink loader of a phase change ink imaging device, the method comprising:

inserting a first ink stick into a feed channel of an ink loader;

inserting a second ink stick into the feed channel;

abutting a trailing canted face of the first ink stick with a leading canted face of the second ink stick;

engaging guides on the abutted ink sticks with guide rails in the feed channel; and urging the first and second ink sticks toward a melt end of the ink loader.

12. The method of claim 11, further comprising:

matching an insertion key on the first and second ink sticks to an insertion opening key of a feed channel.

13. The method of claim 12, the matching of an insertion key further comprising:

identifying a position of the insertion key along a back edge of the ink sticks;

identifying an ink feed channel of the ink loader having a position in the ink loader corresponding to the identified position of the key along the back edge.

14. The method of claim 11, further comprising:

identifying a nomenclature mark on the leading canted face of the first and second ink sticks; and matching the nomenclature mark to a feed channel for use with the first and second ink sticks.

15. The method of claim 11, further comprising:

aligning the first and second ink sticks for insertion such that the leading canted face is facing a melt end of the feed channel prior to insertion.

16. A set of ink sticks for use in a phase change ink imaging device, the set comprising:

a first and second ink stick, the first and second ink sticks each having:

a leading surface, a trailing surface, and a top surface, the top surface having a front edge that is rearwardly offset from a top edge of the leading surface, and a back edge that is at least partially rearwardly offset from the top of the trailing surface;

a leading canted face extending between the top edge of the leading surface and the front edge of the top surface; and a trailing canted face extending between the top edge of the trailing surface and the back edge of the top surface of the top surface, the back edge including a key that is complementary to an insertion opening key of an ink loader;

the leading canted face of the first stick including a nomenclature mark identifying a first insertion opening, and the key of the first ink stick being complementary to the insertion opening key of the first insertion opening; and the leading canted face of second ink stick including a nomenclature mark corresponding to a second insertion opening, and the key of the second ink stick being complementary to the insertion opening key of the second insertion opening.

17. The set of ink sticks of claim 16, the at least partially rearwardly offset portion of the back edge of the ink stick comprising the key.

18. The set of ink sticks of claim 17, a position of the at least partially rearwardly offset portion along the back edge corresponding to a position of the respective insertion openings in the ink loader.

19. Multiple sets of ink sticks for a phase change ink jet printer, the sets being substantially identical, differing by length of the sticks such that color keying features of any one set are substantially identical in position and form relative to a common one of the stick front or rear ends between sets; and each stick in each set of ink sticks further including:

a leading surface, a trailing surface, and a top surface, the top surface having a front edge that is rearwardly offset from a top edge of the leading surface, and a back edge that is at least partially rearwardly offset from the top of the trailing surface;

a leading canted face extending between the top edge of the leading surface and the front edge of the top surface; and a trailing canted face extending between the top edge of the trailing surface and the back edge of the top surface of the top surface, the back edge including a key that is complementary to an insertion opening key of an ink loader;

the leading canted face of the first stick including a nomenclature mark identifying a first insertion opening, and the key of the first ink stick being complementary to the insertion opening key of the first insertion opening; and the leading canted face of second ink stick including a nomenclature mark corresponding to a second insertion opening, and the key of the second ink stick being complementary to the insertion opening key of the second insertion opening.

* * * * *